Aug. 11, 1964 P. VILAIN 3,144,002
DEVICE FOR FEEDING GRANULATED MATERIAL TO FARM ANIMALS
Filed May 13, 1963
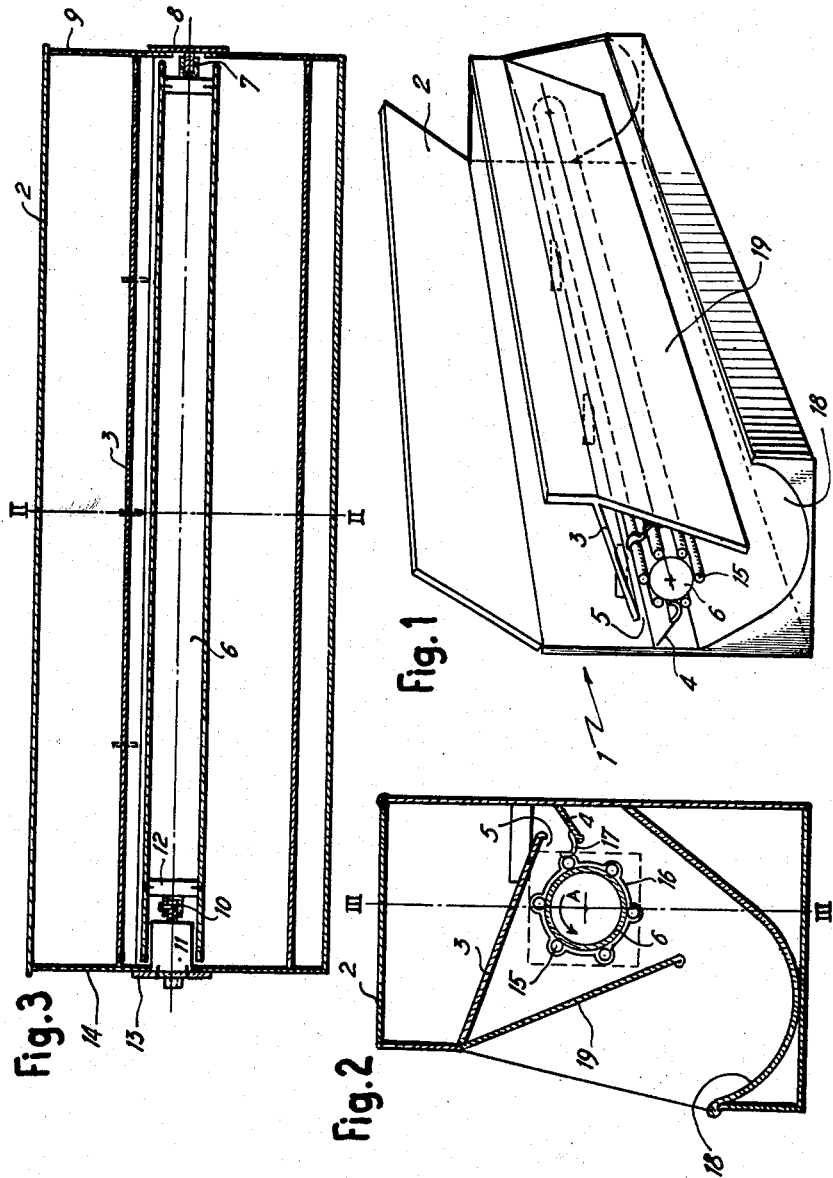

United States Patent Office 3,144,002
Patented Aug. 11, 1964

3,144,002
DEVICE FOR FEEDING GRANULATED
MATERIAL TO FARM ANIMALS
Pierre Vilain, 5 Rue Diderot, Henin Lietard, France
Filed May 13, 1963, Ser. No. 279,832
Claims priority, application France May 14, 1962
6 Claims. (Cl. 119—56)

The present invention relates to a device for feeding granulated material to farm animals, and more specifically to pigs.

Feeding devices are known for automatically feeding metered amounts of granulated material at timed intervals to farm animals. Such devices contribute greatly to the economical operation of farms and especially to the proper fattening of pigs.

It is an object of the present invention to provide a feeding device for feeding farm animals, especially pigs, which permits to feed metered amounts of feed in timed intervals to the animals.

It is a further object of the present invention to provide such a feeding device which will discharge only feed when properly operated.

It is an additional object of the present invention to provide for such a feeding device which requires very little power for its operation.

Finally it is an object of the present invention to provide for a feeding device which includes only few and relatively simple parts so that the device can be manufactured at reasonable cost and will stand up properly under extended use.

With these objects in view, the feeding device according to the present invention for feeding granulated material to farm animals, especially pigs, mainly comprises a feed trough, a container mounted above the trough and adapted to contain granulated material to be fed to the animals, in which the container has a pair of bottom walls inclined toward each other and having a pair of adjacent edge portions offset in vertical and transverse direction with respect to each other so that the bottom walls overlap each other in the region of the edge portions and define between the latter an offset passage having an elongated outlet opening formed between the edge portions. In this type of container the weight of granulated material will rest on the inclined bottom walls. The device includes further a cylinder mounted in the trough turnable about an axis substantially parallel to the edge portions of the bottom walls of the container, extending closely adjacent along the elongated outlet opening and having at any instant a peripheral surface portion located at a higher elevation than the lower one of the aforementioned edge portions. The cylinder is formed with projections on the cylindrical surface thereof which may be in the form of a plurality of rods extending substantially parallel to the axis of the cylinder and fixed substantially equally spaced from each other to the outer surface thereof. The device includes further means operatively connected to the cylinder for rotating the same about its axis in a direction in which the aforementioned peripheral surface portion of the cylinder moves away from the lower edge portion of the bottom walls so that granulated material passing through the outlet opening of the container onto the cylinder is first transported on one side of the cylinder in upward direction to fall subsequently on the other side of the cylinder downwardly into the trough.

The means for rotating the cylinder are preferably in the form of a small gear reduction motor fixed at one end thereof to a side wall of the trough and having drive shaft connected to the cylinder for rotating the same. In this arrangement the cylinder is preferably hollow and the motor is located in one end portion of the hollow cylinder.

The advantage of arranging the cylinder with respect to the outlet opening and with respect to the lower edge portion of the bottom walls of the container in the manner as mentioned above is that discharge of granulated material from the container will be produced only during rotation of the cylinder about its axis, while any discharge of granulated material from the container during standstill of the cylinder is positively prevented, due to the fact that the granulated material leaving the outlet opening of the container is forced to move first in upward direction before it can drop into the trough beneath the container. This will prevent any discharge of granulated material from the container by shaking the whole device.

A further advantage of the above mentioned arrangement and especially an advantage derived by the offset edge portions of the bottom wall of the container, is that a small motor developing a small turning moment can be used for turning the cylinder, since the weight of the granulated material in the container does not rest on the cylinder but on the bottom walls of the container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective view of the feeding device according to the present invention with a sidewall omitted;

FIG. 2 is a section taken along the line II—II of FIG. 3; and

FIG. 3 is a section taken along line III—III of FIG. 2.

The feeding device according to the present invention includes a container 1 having a pair of bottom walls 3 and 4 inclined toward each other and having a pair of adjacent edge portions offset with respect to each other in vertical and transverse direction so that the bottom walls overlap each other in the region of edge portions and define between the latter an offset passage having an elongated outlet opening 5 between the edge portions. The container 1 is closed at the upper end thereof by cover 2, which may be hinged along one edge thereof to a rear wall of the container.

Located beneath the container 1 is a feed trough having a curved bottom wall 18 adapted to receive the granulated material discharged from the container 1 and a pair of side walls 9 and 14 which extend upwardly to form also the side walls of the container 1 and thereby connecting container and trough to each other. Located in the upper region of the trough and beneath the bottom wall 3 of the container is a hollow cylinder 6 extending closely adjacent the outlet opening 5 and being turnable about an axis substantially parallel to the edges of bottom walls 3 and 4. The diameter of the cylinder 6 and the location of the axis thereof is chosen in such a manner that the cylinder has at any instant during its rotation a surface portion which is located at a higher elevation than the edge portion of the lower bottom wall 4 which forms together with the edge portion of the upper bottom wall 3 of the container the outlet opening 5. The cylinder is provided at its outer surface thereof with projections and in the embodiment illustrated the projections are formed by a plurality of rods 15 arranged equally spaced from each other and extending parallel to the axis of the cylinder fixed to the outer surface thereof by a pair of bands 16, only one of which is shown in FIGS. 1 and 2, which are curved about outer portions of the rod 15 and which engage between the rods the outer surface of the cylinder to be fastened thereto in any convenient manner, for instance by screws or nails.

The side wall 14 of the trough is formed in the region of one end of the cylinder 6 with an opening therethrough which is closed by a plate 13 fixed to the side wall in any convenient manner. Projecting inwardly from plate 13 through the opening formed in the side wall 14 and into one end of the hollow cylinder 6 is a motor 11, the housing of which is fixed to the plate 13 in any convenient manner. The drive shaft 10 of motor 11 is releasably connected to a coupling member 12 having a tubular portion surrounding one end of the drive shaft and releasably connected thereto and a transverse portion extending transversely across the interior of the hollow cylinder 6 and being fixed thereto in any convenient manner. The opposite side wall 9 of the trough is likewise formed with an opening therethrough aligned in axial direction with the opening formed in the side wall 14 and closed by a plate 8 fixed to the side wall 9 in any convenient removable manner, for instance by screws, and a pin projecting substantially normal to plate 8 from the latter and fixedly connected thereto is received in a bearing member 7 fixed in the interior of the other end of the cylinder 6.

The arrangement includes further an elongated flexible sealing means 17 in form of a flexible band fixed along one edge portion thereof to the free edge of the lower bottom wall 4 of the container and resiliently engaging with the other edge thereof the outer surface of the cylinder 6 respectively outer surface portions of the bars 15 connected thereto. This flexible sealing means 17 prevents drop of granulated material through any clearance between the free edge of the bottom wall 4 and the cylinder 6. A baffle plate 19 connected at its upper edge to the left edge of the bottom wall 3, as viewed in FIG. 2, and spaced at its lower edge from the curved wall 18 of the trough extends in front of the cylinder 6 spaced at the rear surface thereof from the rods 15 on the cylinder.

The operation of the feeding device according to the present invention will be self-evident from the above description of the same. The motor 11 is connected to a current supply not shown in the drawing in such a manner that during energizing of the motor the cylinder 6 is rotated in the direction of the arrow A, that is in counterclockwise direction, so that a peripheral portion of the cylinder 6 located at any instant at a higher elevation than the free edge of the lower bottom wall 4 is moved away from this edge. When the container 1 is filled with granulated material, this granulated material will pass through the outlet opening 5 onto the surface of the cylinder adjacent the outlet opening and during rotation of the cylinder in the direction of the arrow A granulated material will first be moved by the cylinder in upward direction to fall then on the side of the cylinder distant from the outlet opening 5 in downward direction onto the curved wall 18 of the trough. It is understood that the arrangement includes also switch means, not shown in the drawing, to energize and de-energize the motor 11 at timed intervals as desired. Such switch means may be manually operated, or such switch means may include an automatic timer of well known construction which will switch on and off the motor 11 at predetermined time intervals. The baffle plate 19 protects the cylinder 6 so that the latter cannot be contacted by any animal fed by the device. Furthermore, the arrangement is made in such a manner that drop of granulated material from the container 1 into the curved wall 18 is positively prevented when the cylinder is not rotated, even if the whole device should be shaken by an animal, since in order for the granulated material to pass through the outlet opening 5 into the trough the granulated material has to move first in upward direction which movement can be accomplished only during rotation of the cylinder 6 about its axis.

It will be understood that each of the elements described above, or two or more together, may also find a useful application in other types of feeding devices differing from the types described above.

While the invention has been illustrated and described as embodied in a feeding device for feeding granulated material to farm animals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for feeding granulated material to farm animals, especially pigs, comprising, in combination, a feed trough; a container mounted above said trough and adapted to contain granulated material to be fed to the animals, said container having a pair of bottom walls inclined toward each other and having a pair of adjacent edge portions offset in vertical and transverse direction with respect to each other so that said bottom walls overlap each other in the region of said edge portions and define between the latter an offset passage having an elongated outlet opening formed between said edge portions, whereby the weight of granulated materials in said container will rest on said inclined bottom walls; a cylinder mounted in said trough turnable about an axis substantially parallel to said edge portions, extending closely adjacent alongside said elongated outlet opening and having at any instant a peripheral surface portion located at a higher elevation than the lower one of said edge portions and at a higher elevation than said outlet opening, said cylinder being formed with projections on its cylindrical surface; and means operatively connected to said cylinder for rotating the same about its axis in a direction in which said peripheral surface portion of said cylinder moves upward from said lower edge portion to a point higher than said outlet opening and then moves downward so that granulated material passing through said outlet opening onto said cylinder is first transported on one side of said cylinder in upward direction to said point to fall subsequently on the other side of said cylinder downwardly into said trough.

2. A device for feeding granulated material to farm animals, especially pigs, comprising, in combination, a feed trough; a container mounted above said trough and adapted to contain granulated material to be fed to the animals, said container having a pair of bottom walls inclined toward each other and having a pair of adjacent edge portions offset in vertical and transverse direction with respect to each other so that said bottom walls overlay each other in the region of said edge portions and define between the latter an offset passage having an elongated outlet opening formed between said edge portions, whereby the weight of granulated material in said container will rest on said inclined bottom walls; a cylinder mounted in said trough turnable about an axis substantially parallel to said edge portions, extending closely adjacent alongside said elongated outlet opening and having at any instant a peripheral surface portion located at a higher elevation than the lower one of said edge portions and at a higher elevation than said outlet opening; a plurality of rods extending substantially parallel to the axis of said cyjinder and being fixed substantially equally spaced from each other to the outer surface of said cylinder; and means operatively connected to said cylinder for rotating the same about its axis in a direction in which said peripheral surface portion of said cylinder moves upward from said lower edge portion to a point higher than said outlet opening and then moves downward so that granulated material passing through said outlet opening onto said cylinder is first transported on one side of said cylinder in upward direction to said point to fall subsequently on the other side of said cylinder downwardly into said trough.

3. A device for feeding granulated material to farm animals, especially pigs, comprising, in combination, a feed trough; a container mounted above said trough and adapted to contain granulated material to be fed to the animals, said container having a pair of bottom walls inclined toward each other and having a pair of adjacent edge portions offset in vertical and transverse direction with respect to each other so that said bottom walls overlap each other in the region of said edge portions and define between the latter an offset passage having an elongated outlet opening formed between said edge portions, whereby the weight of granulated material in said container will rest on said inclined bottom walls; a hollow cylinder mounted in said trough turnable about an axis substantially parallel to said edge portions, extending closely adjacent alongside said elongated outlet opening and having at any instant a peripheral surface portion located at a higher elevation than the lower one of said edge portions and at a higher elevation than said outlet opening, said cylinder being formed with projections on its cylindrical surface; and a gear reduction motor fixed at one end thereof to said trough and extending from said one end into said hollow cylinder, said motor having a drive shaft connected to said cylinder for rotating the same about its axis in a direction in which said peripheral surface portion of said cylinder moves upward from said lower edge portion to a point higher than said outlet opening and then moves downward so that the granulated maerial passing through said outlet opening onto said cylinder is first transported on one side of said cylinder in upward direction to said point to fall subsequently on the other side of said cylinder downwardly into said trough.

4. A device for feeding granulated material to farm animals, especially pigs, comprising, in combination, a feed trough; a container mounted above said trough, and adapted to contain granulated material to be fed to the animals, said container having a pair of bottom walls inclined toward each other and having a pair of adjacent edge portions offset in vertical and transverse direction with respect to each other so that said bottom walls overlap each other in the region of said edge portions and define between the latter an offset passage having an elongated outlet opening formed between said edge portions, whereby the weight of granulated material in said container will rest on said inclined bottom walls; a cylinder mounted in said trough turnable about an axis substantially parallel to said edge portions, extending closely adjacent alongside said elongated outlet opening and having at any instant a peripheral surface portion located at a higher elevation than the lower one of said edge portions and at a higher elevation than said outlet opening, said cylinder being formed with projections on its cylindrical surface; elongated flexible sealing means fixed along one edge thereof to said lower edge portion and engaging with the other edge thereof the outer surface of said cylinder for preventing any granulated material to drop between the surface of said cylinder and said lower edge portion into said trough; and means operatively connected to said cylinder for rotating the same about its axis in a direction in which said peripheral surface portion of said cylinder moves upward from said lower edge portion to a point higher than said outlet opening and then moves downward so that granulated material passing through said outlet opening onto said cylinder is first transported on one side of said cylinder in upward direction to said point to fall subsequently on the other side of said cylinder downwardly into said trough.

5. A device for feeding granulated material to farm animals, especially pigs, comprising, in combination, an elongated feed trough having a pair of side walls and a curved bottom wall; an elongated container mounted above said trough and adapted to contain granulated material to be fed to the animals, said container having a pair of bottom walls inclined toward each other and having a pair of adjacent edge portions offset in vertical and transverse direction with respect to each other so that said bottom walls overlap each other in the region of said edge portions and define between the latter an offset passage having an elongated outlet opening formed between said edge portions, whereby the weight of granulated material in said container will rest on said inclined bottom walls; a hollow cylinder extending between said side walls of said trough and closely adjacent alongside said elongated outlet opening and being turnable about an axis substantially parallel to said edge portions, said cylinder having at any instant a peripheral surface portion located at a higher elevation than the lower one of said edge portions and at a higher elevation than said outlet opening; a plurality of rods extending substantially parallel to the axis of said cylinder and being fixed substantially equally spaced from each other to the outer surface thereof; a gear reduction motor fixed at one end thereof to one of said side walls of said trough and extending from said one end into one end of said hollow cylinder so as to be housed in the latter, said motor having a drive shaft connected to said cylinder for rotating the same about its axis in a direction in which said peripheral surface portion of said cylinder moves upward from said lower edge portion to a point higher than said outlet opening and then moves downward so that granulated material passing through said outlet opening onto said cylinder is first transported along one side thereof in upward direction to said point to fall subsequently along the other side thereof downwardly into said trough; elongated flexible sealing means fixed along one edge thereof to said lower edge portion and engaging with the other edge thereof the outer surface of said cylinder for preventing any granulated material from dropping between the surface of said cylinder and said lower edge portion into said trough; and bearing means fixed to the other side wall of said trough and supporting the other end of said cylinder.

6. A device for feeding granulated material to farm animals, especially pigs, comprising, in combination, an elongated feed trough having a pair of side walls and a curved bottom wall; an elongated container mounted above said trough and adapted to contain granulated material to be fed to the animals, said container having a pair of bottom walls inclined toward each other and having a pair of adjacent edge portions offset in vertical and transverse direction with respect to each other so that said bottom walls overlap each other in the region of said edge portions and define between the latter an offset passage having an elongated outlet opening formed between said edge portions, whereby the weight of granulated material in said container will rest on said inclined bottom walls; a hollow cylinder extending between said side walls of said trough and closely adjacent alongside said elongated outlet opening and being turnable about an axis substantially parallel to said edge portions, said cylinder having at any instant a peripheral surface portion located at a higher elevation than the lower one of said edge portions and at a higher elevation than said outlet opening; a plurality of rods extending substantially parallel to the axis of said cylinder and being fixed substantially equally spaced from each other to the outer surface thereof; a gear reduction motor fixed at one end thereof to one of said side walls of said trough and extending from said one end into one end of said hollow cylinder so as to be housed in the latter, said motor having a drive shaft connected to said cylinder for rotating the same about its axis in a direction in which said peripheral surface portion of said cylinder moves upward from said lower edge portion to a point higher than said outlet opening and then moves downward so that granulated material passing through said outlet opening onto said cylinder is first transported along one side thereof in upward direction to said point to fall subsequently along the other side thereof downwardly into said trough; elongated flexible sealing means fixed along one edge thereof to said lower edge portion and engaging with the other edge thereof the outer surface of said cylinder for preventing any granulated material from dropping between the surface of said cylinder and said lower edge portion into said trough; bearing means fixed to the other side wall of said trough and supporting the other end of said cylinder; and a baffle plate extending in front of said cylinder toward said curved bottom wall of said trough and being spaced at a lower edge portion thereof from the latter.

References Cited in the file of this patent

UNITED STATES PATENTS

| | | |
|---|---|---|
| 2,793,791 | Clark | May 28, 1957 |
| 2,981,229 | Brown | Apr. 25, 1961 |